United States Patent
Evans et al.

(10) Patent No.: US 8,711,683 B2
(45) Date of Patent: Apr. 29, 2014

(54) NETWORK TRAFFIC DEMOTION

(75) Inventors: John Evans, Chiswick (GB); Francois Le Faucheur, Valbonne (FR); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 1685 days.

(21) Appl. No.: 11/725,910

(22) Filed: Mar. 19, 2007

(65) Prior Publication Data

US 2008/0232247 A1    Sep. 25, 2008

(51) Int. Cl.
*H04L 12/28* (2006.01)
*H04L 12/56* (2006.01)

(52) U.S. Cl.
CPC ............ *H04L 47/10* (2013.01); *H04L 47/2458* (2013.01); *H04L 45/28* (2013.01)
USPC .......................................... 370/228; 370/229

(58) Field of Classification Search
CPC ......................... H04L 47/10; H04L 47/2458
USPC .................................................. 370/229–238
See application file for complete search history.

(56) References Cited

U.S. PATENT DOCUMENTS

| | | | |
|---|---|---|---|
| 6,879,560 B1 * | 4/2005 | Cahn | 370/230.1 |
| 7,042,838 B1 * | 5/2006 | Shand et al. | 370/225 |
| 7,197,008 B1 * | 3/2007 | Shabtay et al. | 370/236.2 |
| 7,817,539 B2 * | 10/2010 | Lysne et al. | 370/238 |
| 2005/0120102 A1 | 6/2005 | Gandhi et al. | |
| 2005/0265228 A1 * | 12/2005 | Fredette et al. | 370/216 |
| 2006/0133279 A1 | 6/2006 | Le Faucheur et al. | |
| 2006/0215548 A1 * | 9/2006 | Le Faucheur et al. | 370/228 |

OTHER PUBLICATIONS

F. LeFaucheur et al., "Multi-Protocol Label Switching (MPLS) Support of Differentiated Servicies" IETF RFC 3270, May 2002.
M. Pierce et al., "Multi-Level Expedited Forwarding Per Hop Behavior (MLEF PHB)", IETF Internet Draft, Feb. 12, 2005.

* cited by examiner

*Primary Examiner* — Steven H Nguyen
(74) *Attorney, Agent, or Firm* — Cindy Kaplan

(57) ABSTRACT

A method and apparatus for demoting network traffic are disclosed. In one embodiment, a method includes transmitting traffic associated with a session over a first path, and maintaining state information identifying the first path as a forwarding path for the session. Traffic associated with the session is rerouted from the first path to a second path following a network failure and the rerouted traffic is marked so that at least a portion of the rerouted traffic can be dropped at any point in the network if rerouting causes network congestion.

18 Claims, 5 Drawing Sheets

NETWORK TRAFFIC DEMOTION

BACKGROUND OF THE INVENTION

The present disclosure relates generally to demoting network traffic to provide QoS (Quality of Service) for voice or mission critical traffic during a network failure.

An important requirement for migrating PSTN (public switched telephone network) voice services to IP networks is to provide the same levels of quality for voice services that are currently available with PSTN. A number of techniques are available to provide very tight QoS in the absence of failure, however, none of these voice load control approaches perform very well during a network failure. Thus, providing strict QoS to voice during network failure still remains an open problem in large scale voice deployment where the proportion of voice traffic is high.

A desired mechanism to provide tight QoS to voice services in IP networks has the ability to provide deterministic end-to-end admission control. In order to maintain QoS (or mitigate QoS degradation) it is important to provide rapid recovery around network failures. A number of techniques are available to provide very fast recovery in case of failure. However, with rapid recovery there is not enough time to make a new admission control decision before rerouting traffic due to a network failure. Thus, congestion may occur in the transient period before call admission control is performed again after the traffic rerouting.

There are only limited options currently available for protecting QoS over the period during which fast recovery mechanisms are in use. One option is to allocate a large amount of capacity to make sure QoS of all targeted traffic can be maintained during any failure scenario. This requires a significant amount of bandwidth to be dedicated to backup paths to protect all voice traffic in all targeted failure scenarios. Another option is to accept that any flow from the targeted traffic may be degraded during a failure. This may cause congestion that affects both the original traffic and the rerouted traffic, thus resulting in QoS degradation for all the traffic flow.

DESCRIPTION OF EXAMPLE EMBODIMENTS

Overview

A method and apparatus for demoting network traffic are disclosed. In one embodiment, the method generally comprises transmitting traffic associated with a session over a first path, and maintaining state information identifying the first path as a forwarding path for the session. Traffic associated with the session is rerouted from the first path to a second path following a network failure and the rerouted traffic is marked so that at least a portion of the rerouted traffic can be dropped at any point in the network if rerouting causes network congestion.

An apparatus for demoting network traffic generally comprises memory for storing state information identifying a first path as a forwarding path for a session, a controller operable to reroute traffic associated with the session from the first path to a second path following a network failure, and a traffic demoter configured to mark the rerouted traffic so that at least a portion of the rerouted traffic can be dropped if rerouting causes network congestion.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein protect QoS for voice (or other targeted traffic) during network failure by mitigating QoS degradation. Following a network failure, dynamic routing mechanisms are used to reroute traffic to a backup path. The method and system identify a subset of traffic that was affected by the network failure after the rerouting takes place, so that differentiated QoS policies can be applied to the rerouted traffic at any point in the network. This allows QoS degradation due to a network failure to be localized to the subset of traffic that was affected by the failure in cases where the actual traffic load exceeds available bandwidth after traffic is rerouted. QoS mechanisms are used to reflect the identification and enforce a QoS policy so that the non-rerouted traffic gets priority over the rerouted traffic. If there is no congestion after a network failure, there is no degradation of traffic, however, if there is congestion somewhere in the network after the failure, only the subset of traffic which is affected by the failure is degraded while the rest of the traffic is protected.

Figure 1:
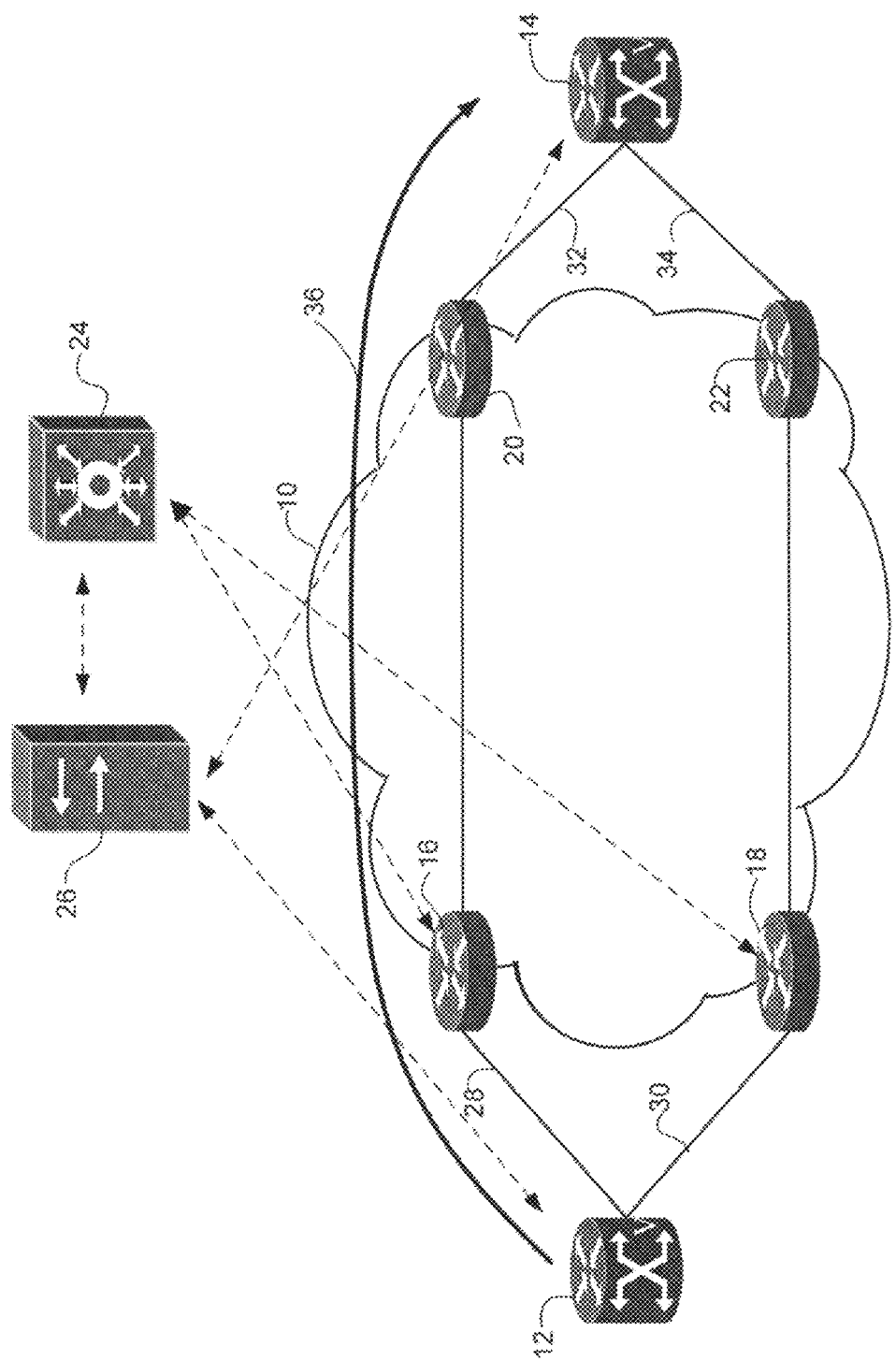
FIG. 1 illustrates an example of a network in which embodiments described herein may be implemented.

Referring now to the drawings, and first to FIG. 1, one example of a network that may implement embodiments described herein is shown. The system operates in the context of a data communication network including multiple network elements. Some of the elements in a network that employs the system may be network devices such as gateways, routers, or switches. The network device may include, for example, a master central processing unit (CPU), interfaces, and a bus. The CPU preferably includes memory and a processor. The network device may be implemented on a general purpose network host machine such as described below with respect to FIG. 5. The system and method are described herein with reference to a representative application but is not limited to this application. In the representative application, calls such as voice or video calls are carried across a packet network such as an IP network. The network devices operate in accordance with various protocols including, for example, TCP/IP, MPLS (multiprotocol label switching), MPLS Traffic Engineering, and MPLS Fast Reroute.

Figure 2:
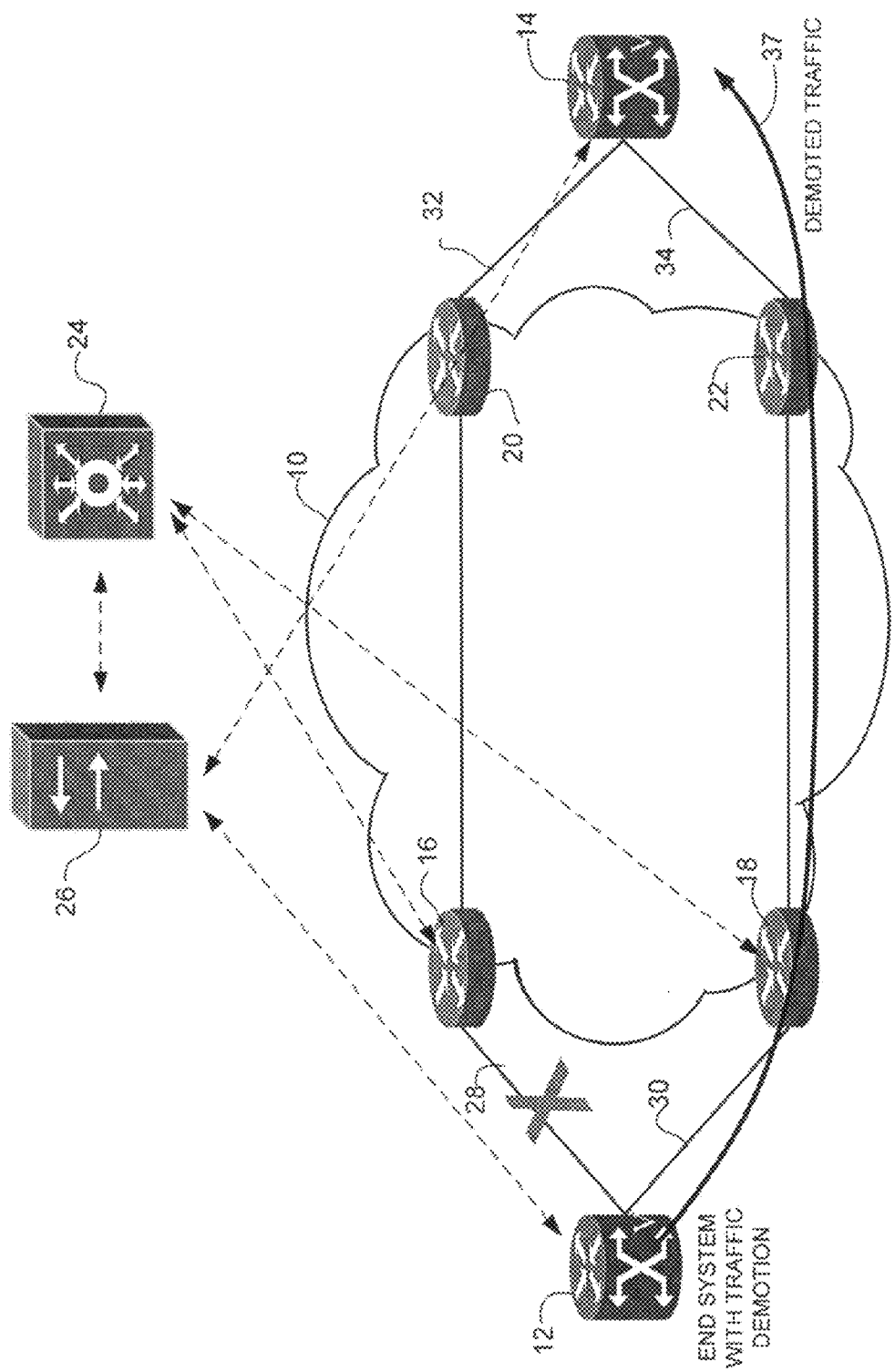
FIG. 2 shows the network of FIG. 1 following a network failure.

The network shown in FIG. 1 includes a core network 10 (e.g., IP/MPLS network) in communication with two end system nodes 12, 14. In the example described herein, the end systems are voice over IP (VoIP) gateways, however, it is to be understood that other types of gateways or end systems may be used without departing from the scope of the invention. The gateways 12, 14 may be in communication with a public switched telephone network (PSTN) or user devices such as telephones, video phones, computers, etc. Each gateway 12, 14 is in communication with the core network 10 through at least two communication paths (for redundancy or capacity purposes). It is to be understood that additional paths may be provided to link the gateways 12, 14 to the network 10. In the example shown in FIG. 1, gateway 12 is in communication with edge routers 16, 18 through access links 28 (first path) and 30 (second path), respectively, and gateway 14 is in communication with edge routers 20, 22 through access links 32, 34, respectively. For simplification only edge routers are shown in the core network 10. Any number of additional network elements (e.g., routers, switches) may be located within the core network 10 in the communication path between the edge routers. Traffic may be carried over tunnels (e.g., MPLS TE tunnels) extending between the edge routers. For example, a primary tunnel may extend between edge routers 16 and 20 and a backup tunnel may extend between edge routers 18 and 22. The edge routers preferably notify a bandwidth manager 24 of the tunnel status and the bandwidth manager applies CAC of calls over the tunnels. Call server 26 communicates with the bandwidth manager (BWM) 24 to check bandwidth availability for call admission. Preferably, the bandwidth manager 24 and the gateways 12, 14 maintain state information on which calls have been successfully admitted for use in demoting traffic following a network failure, as shown in FIG. 2 and described below.

It is to be understood that the network shown in FIG. 1 is only one example, and other network configurations and voice load control architectures may be used without departing from the scope of the invention. For example, RSVP may be used to provide application level CAC feedback, rather than a bandwidth manager. In another embodiment, RSVP may be used with partial bandwidth protection.

Figure 3:
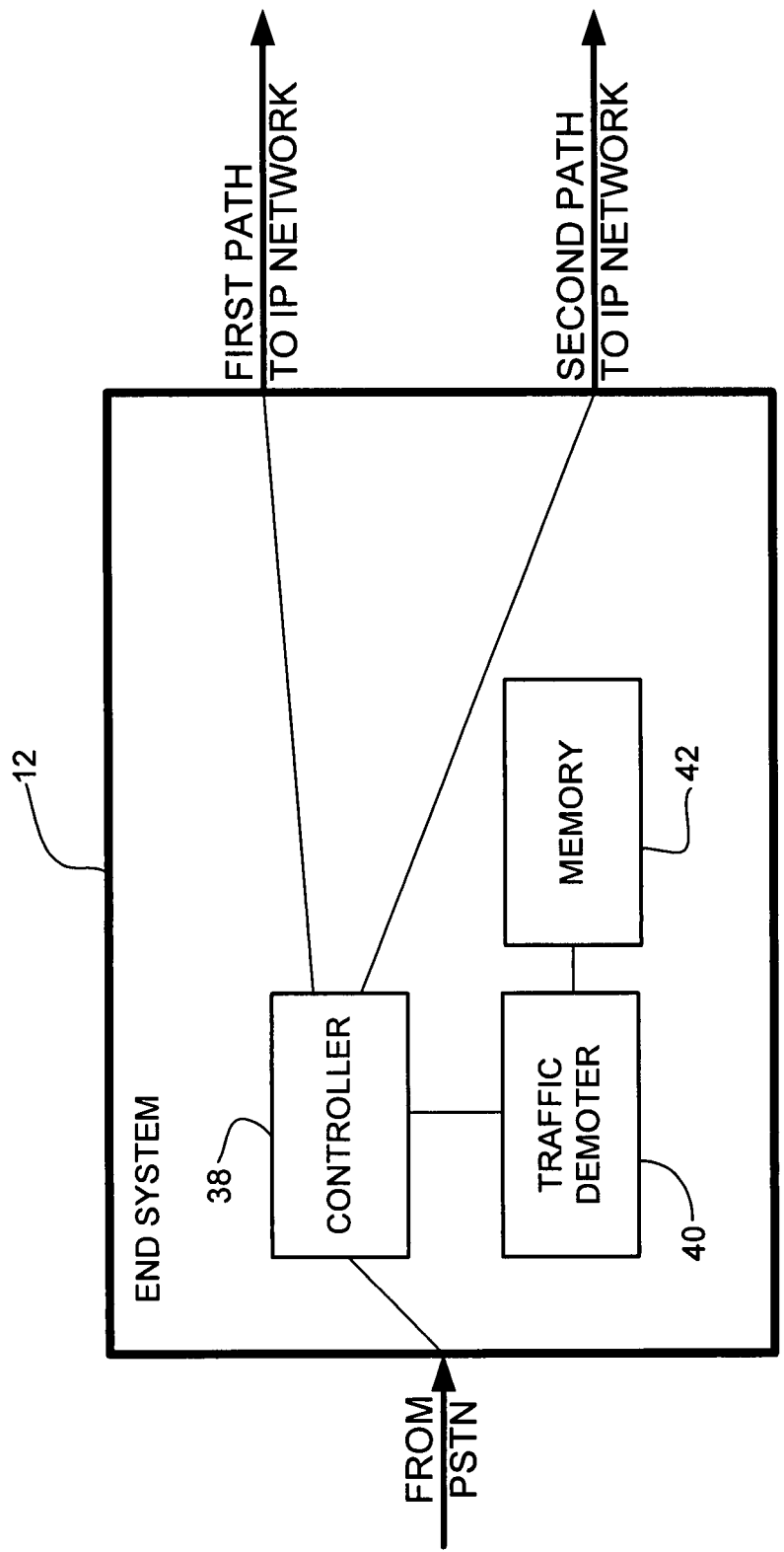
FIG. 3 is a block diagram illustrating one example of an end system with traffic demotion.

FIG. 3 is a block diagram illustrating one example of a network device that may be used to implement the embodiments described herein. The end system 12 receives traffic from a PSTN and transmits the traffic to a first path or a second path to the network 10. A controller 38 selects the path based on call admission control information received from the call agent 26. State information identifying a first path associated with a session is stored in memory 42. Upon receiving notification of a failure of a primary path, the controller 38 switches the traffic to a backup path. Traffic demoter 40 is used to mark packets associated with a session admitted to the primary path and rerouted to the backup path following a failure. The state information is used to identify traffic associated with a call that has been rerouted after being admitted and assigned to a primary path.

Prior to failure, the voice load on the network is controlled to ensure strict QoS voice traffic using conventional voice load control techniques (e.g., capacity planning, Bandwidth Manager CAC, RSVP-based CAC, or other suitable techniques). For example, when a user on gateway 12 calls a user on gateway 14, the call server 26 checks with the bandwidth manager 24 to make sure that there is sufficient bandwidth available for the call (FIG. 1). If bandwidth is available, the bandwidth manager 24 responds to the call server 26 and the call is set up. The call has a source address of gateway 12 (local end system), destination address of gateway 14 (remote end system) and uses link 28 to access edge router 16. As illustrated by line 36, the call follows a communication path from gateway 12 through access link 28 to edge router 16. The call is then forwarded to gateway 14 through edge router 20.

FIG. 2 shows the network of FIG. 1 following a failure at access link 28. Regardless of the approach used for voice load control, there is a period of time needed by the voice load control mechanism to adjust to a new routing state. During this transient period, some voice traffic is rerouted onto link 30 and follows path 37. After the network failure, communication path 37 contains both the rerouted traffic and traffic associated with sessions that were originally admitted onto any link of path 37, such as access link 30 (non-rerouted traffic). Rerouting of the traffic may cause congestion in the network on any link of path 37. As described below, a demotion mechanism is used to mark packets which are rerouted so that a differential dropping mechanism can be activated on any link in the network.

Figure 4:
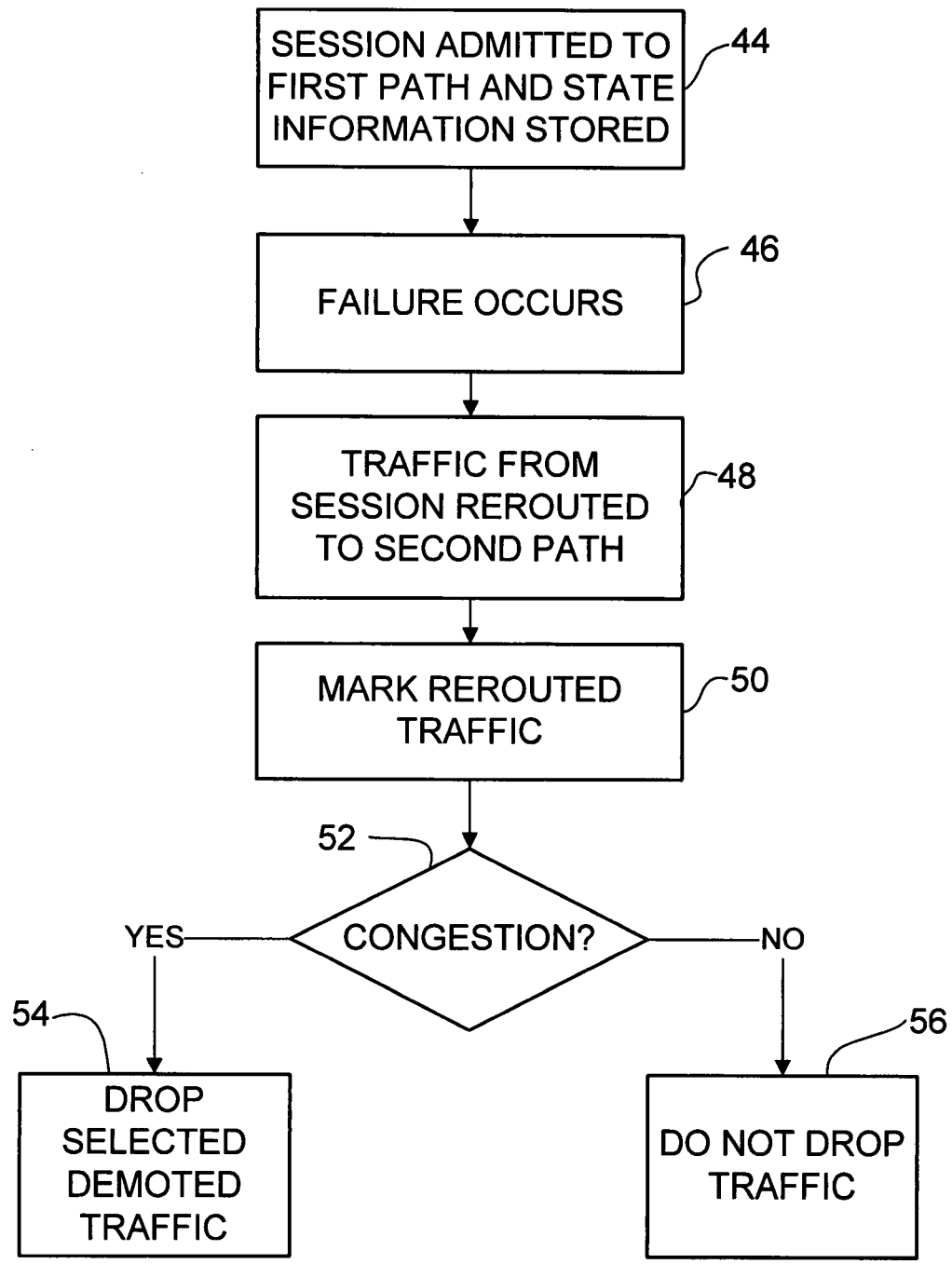
FIG. 4 is a flowchart illustrating a traffic demotion process in accordance with one embodiment.

FIG. 4 is a flowchart illustrating a process for end system traffic demotion in accordance with one embodiment. A new session (e.g., voice call) is received at gateway 12 and the session is admitted if bandwidth is available in accordance with an admission control set up on the gateway (step 44) (FIGS. 1 and 4). The gateway maintains a state on which interface the session is forwarded from when the session is set up. At step 46, a failure occurs at link 28 (FIGS. 2 and 4). The traffic previously routed on link 28 is rerouted to link 30 and both the regular session (non-rerouted) traffic and the rerouted traffic are scheduled (step 48). Traffic from a session that is currently being forwarded out of the same interface as when the session was first set up is routed the same as before the failure occurred. Traffic from a session that is being rerouted from link 28 to link 30 is demoted (i.e., marked) (step 50). The end system 12 uses the forwarding state information to identify rerouted traffic. Since the rerouting is done before a new admission control decision can be made, in order to minimize the impact of the failure on the call, it may result in traffic being rerouted onto a path that does not have sufficient bandwidth for the rerouted packets, therefore, congestion may occur. If the network has enough capacity for all of the traffic, the system protects traffic (i.e., does not drop packets) and no QoS degradation occurs (steps 52 and 56). The rerouted packets are handled the same as the packets not affected by the failure and transmitted in the same manner. However, if not enough capacity is available and congestion occurs, QoS degradation is localized to the subset of demoted voice packets. At least a portion of demoted traffic is dropped to protect the QoS of the non-rerouted traffic (steps 52 and 54). The system therefore protects the calls which were not transiting via the failed link by dropping only rerouted traffic. These calls will either not have been admitted on the rerouted path or will already have experienced some loss as a result of being rerouted. The system minimizes the number of calls affected by dropping some or all of the packets from a smaller subset of calls, rather than dropping randomly across all calls.

If call admission control is subsequently applied to the call, the demotion of the rerouted traffic may stop. Similarly, for calls made after the failure, if an admission control decision is made for those calls, they do not need to be demoted, as long as they are not rerouted. For example, in a system using RSVP deployment, once a new admission control decision is successfully made by RSVP, the traffic is no longer demoted. However, in a system which uses a bandwidth manager, the traffic preferably remains demoted for the duration of the call.

Referring again to FIGS. 1 and 2, either one or both of the gateways 12, 14 may be configured to demote traffic. In one embodiment, the gateway may identify marked packets that are received at the gateway. For example, gateway 14 may receive demoted packets from gateway 12 (that have not been dropped) and use this information to demote (mark) packets which are associated with the same session and destined for gateway 12. This allows preferential dropping of rerouted traffic on the return path to gateway 12.

A number of different fields in the packets may be used for marking demoted traffic. For example, if the gateway 12, 14 is attached at an IP interface, a DSCP (Differentiated Service Code Point) may be used to mark the demoted packets. If the core network is an MPLS network, the experimental field (EXP) in an MPLS label in the backup tunnel stack entry may be remarked to a configurable value.

As discussed above, if voice congestion is identified in the path of the rerouted traffic, a necessary amount of demoted traffic is dropped to protect the QoS of traffic not affected by the failure. The traffic may be monitored and dropped at any node within the communication path. For example, the traffic may be dropped at the end system or edge router if congestion is identified within the communication path between the two end systems. Queueless or queue-based approaches may be used to ensure that the necessary amount of demoted traffic is dropped if congestion occurs.

Queueless rate control techniques may include, for example, HMMP (Hierarchical Multi-rate Multi-precedence Policer), as described in U.S. patent application Ser. No. 11/019,915 (Francois Le Faucheur et al., filed Dec. 21, 2004), or Coupled Policers, described in U.S. patent application Ser. No. 10/607,711 (Prashant Gandhi et al., filed Jun. 27, 2003), which are both incorporated by reference herein in their entirety.

For example, HMMP may be used to police separately the demoted voice and the regular (non-demoted) voice traffic. The policing rate for the demoted voice traffic is the difference between a configured maximum acceptable rate for the EF queue and the rate currently consumed by regular voice traffic. Token buckets may be used for demoted voice (Td) and regular voice (Tr). In one embodiment, Tr and Td are both filled at the same rate (R). Td is checked before transmitting a demoted voice packet. If there are not enough available tokens, the packet is dropped. If there are available tokens, Td is decremented and the packet is transmitted. Tr is checked before transmitting a regular voice packet. If there are not enough tokens, the packet is dropped. If enough tokens are available, Tr is decremented and the packet is transmitted. Whenever Tr is decremented, Td is also decremented by the same amount.

In another example, Coupled Policers may be used to control how bandwidth left unused by regular voice traffic is redistributed to demoted traffic. As described above with regard to HMMP, a token bucket Td is used for demoted voice packets and Tr for regular voice packets. For demoted voice packets, if Td does not have enough tokens, the demoted voice packet is dropped. If Td has available tokens, Td is decremented and the packet is transmitted. For regular voice packets, if Tr does not have enough tokens, the packet is dropped. If Tr has available tokens, Tr is decremented and the packet is transmitted. In this example, Tr is filled at rate R and Td is only filled up by tokens overflowing from Tr. Whenever Tr gets filled up (i.e., reaches its maximum burst), any excess token goes into Td.

Queue-based approaches include, for example, Multi-Level Expedited Forwarding (MLFF), described in "Multi-Level Expedited Forwarding Per Hop Behavior (MLEF PHB)", draft-silverman-tsvwg-mlefphb-02.txt, Feb. 12, 2005, which is incorporated herein by reference in its entirety. MLEF may be used, for example, to apply different drop thresholds within the EF queue to detect a congestion situation and drop the demoted traffic. Another queue-based approach includes separate or hierarchical scheduling of the demoted voice traffic and regular voice traffic.

It is to be understood that the methods described above for use in handling the demoted traffic in the case of congestion are only examples, and that other methods may be used without departing from the scope of the invention. For example, the demotion may be used in combination with various QoS mechanisms (e.g., RED, WRED, tail-drop, separate parallel or hierarchical queue) to enforce the QoS differentiation in case of congestion.

Figure 5:
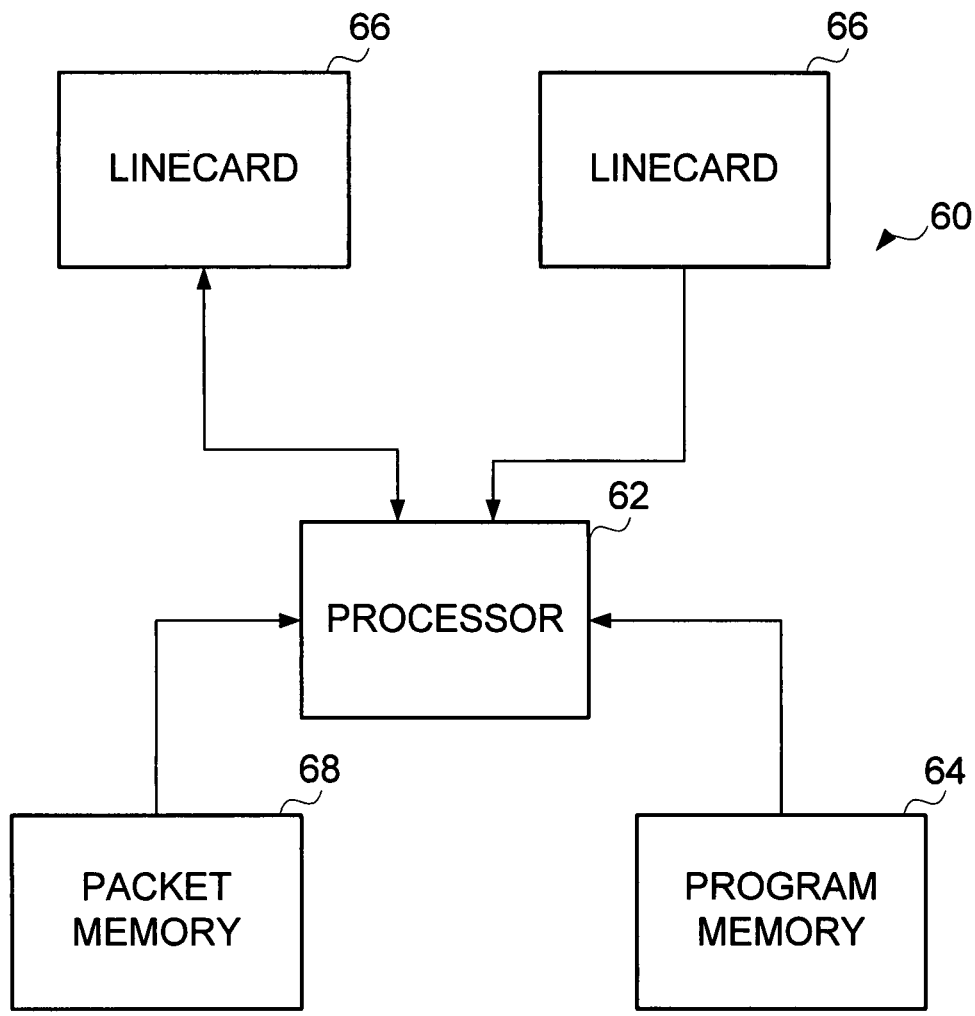
FIG. 5 depicts an example of a network device useful in implementing the embodiments described herein.

FIG. 5 depicts a network device 60 that may be used to implement the network elements of FIG. 1. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Any number of linecards 66 may be used and each linecard may include numerous separate physical interfaces. Linecards 66 may incorporate DSL interfaces, Ethernet interfaces, Gigabit Ethernet interfaces, 10-Gigabit Ethernet interfaces, Frame relay interfaces, ATM interfaces, SONET interfaces, dial-up interfaces, wireless interfaces, etc. The various components are interconnected by a backplane. As packets are received, processed, and forwarded by network device 60, they may be stored in a packet memory 68.

As can be observed from the foregoing, the system and method described herein have many advantages. For example, the system and method allow operators to avoid the cost of provisioning back up capacity to protect peak load during any possible failure while at the same time minimizing QoS degradation impact on key traffic (e.g., voice). This is important where a proportion of key traffic is high. The operator is able to provision as much capacity for backup as is appropriate and take advantage of that capacity to its full extent without QoS loss on any traffic, if the actual load fits after reroute. Also, the majority of key traffic can be protected from QoS degradation if the actual load does not fit after reroute. The QoS degradation can be localized to the subset of traffic which is affected by failure if the actual load does not fit after reroute.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for demoting traffic in a network, comprising:
   transmitting at a network device, traffic associated with a session over a first path and maintaining state information identifying said first path as a forwarding path for said session, said session comprising a voice call;
   rerouting traffic received at the network device and associated with said session from said first path to a second path following a network failure;
   marking at the network device, the rerouted traffic so that at least a portion of the rerouted traffic can be dropped at a node in the network if said rerouting of the traffic causes network congestion; and applying call admission control to said voice call to admit said voice call to said second path and stopping said marking of the rerouted traffic.

2. The method of claim 1 wherein the traffic is transmitted at a voice over IP gateway.

3. The method of claim 1 further comprising:
receiving marked traffic associated with a new session from a remote end system;
receiving traffic associated with said new session and destined for the remote end system;
marking said traffic associated with said new session so that at least a portion of said marked traffic can be dropped if congestion is identified.

4. The method of claim 1 wherein marking the rerouted traffic comprises marking a Differentiated Service Code Point field in packets of the rerouted traffic.

5. The method of claim 1 wherein marking the rerouted traffic comprises marking an EXP field in one or more MPLS (multiprotocol label switching) label stack entries in packets of the rerouted traffic.

6. The method of claim 1 wherein the traffic is transmitted at an end system and said first and second paths are access links connecting the end system to a core network.

7. An apparatus configured for receiving traffic associated with a session and transmitting the traffic over a first path, the apparatus comprising:
memory for storing state information identifying said first path as a forwarding path for said session;
a controller operable to reroute the traffic associated with said session from said first path to a second path following a network failure; and
a traffic demoter configured to mark the rerouted traffic so that at least a portion of the rerouted traffic can be dropped if rerouting of the traffic causes network congestion;
wherein said session is a voice call and said traffic demoter is configured to stop marking the rerouted traffic after applying call admission control to said voice call.

8. The apparatus of claim 7 wherein the traffic demoter is configured to mark a Differentiated Service Code Point field in packets of the rerouted traffic.

9. The apparatus of claim 7 wherein the traffic demoter is configured to mark an EXP field in one or more MPLS (multiprotocol label switching) label stack entries in packets of the rerouted traffic.

10. The apparatus of claim 7 wherein the apparatus is configured to identify marked packets received from a remote end system and associated with a new session, and the traffic demoter is configured to mark packets destined for the remote end system and associated with the new session.

11. The apparatus of claim 7 wherein the apparatus is a voice over IP gateway.

12. The apparatus of claim 7 wherein the apparatus is an end system and said first and second paths are access links connecting the end system to a core network.

13. An apparatus for demoting traffic in a network, comprising:
a processor; and
a computer readable storage device that stores instructions for execution by the processor and when executed operable to:
transmit traffic associated with a session over a first path and maintaining state information identifying said first path as a forwarding path for said session, said session comprising a voice call;
reroute traffic received at the apparatus and associated with said session from said first path to a second path following a network failure;
mark the rerouted traffic so that at least a portion of the rerouted traffic can be dropped at a node in the network if rerouting of the traffic causes network congestion; and
apply call admission control to said voice call to admit said voice call to said second path and stop said marking of the rerouted traffic.

14. The apparatus of claim 13 wherein the apparatus is a voice over IP gateway.

15. The apparatus of claim 13 wherein the apparatus is configured to identify marked packets received from a remote end system and associated with a new session, and wherein said instructions when executed are further operable to mark the traffic associated with said new session so that at least a portion of the marked traffic can be dropped if congestion is identified.

16. The apparatus of claim 13 wherein marking the rerouted traffic comprises marking a Differentiated Service Code Point field in packets of the rerouted traffic.

17. The apparatus of claim 13 wherein marking the rerouted traffic comprises marking an EXP field in one or more MPLS (multiprotocol label switching) label stack entries in packets of the rerouted traffic.

18. The apparatus of claim 13 wherein the apparatus is an end system and said first and second paths are access links connecting the end system to a core network.

* * * * *